United States Patent
Whitney et al.

(10) Patent No.: US 8,086,390 B2
(45) Date of Patent: Dec. 27, 2011

(54) PUMPING LOSS REDUCTION SYSTEMS AND METHODS

(75) Inventors: Christopher E. Whitney, Highland, MI (US); Poh Fong Chin, Novi, MI (US); William L. Aldrich, III, Davisburg, MI (US); Anthony H. Heap, Ann Arbor, MI (US); Jeffrey M. Kaiser, Highland, MI (US); Jun Lu, Novi, MI (US)

(73) Assignee: GM Global Technology Operations LLC

( * ) Notice: Subject to any disclaimer, the term of this patent is extended or adjusted under 35 U.S.C. 154(b) by 222 days.

(21) Appl. No.: 12/629,152

(22) Filed: Dec. 2, 2009

(65) Prior Publication Data

US 2011/0100013 A1    May 5, 2011

Related U.S. Application Data

(60) Provisional application No. 61/256,363, filed on Oct. 30, 2009.

(51) Int. Cl.
*G06F 19/00*    (2006.01)

(52) U.S. Cl. ........... 701/112; 123/435; 123/332; 60/285

(58) Field of Classification Search .......... 701/102–104, 701/112, 113, 114; 123/434, 435, 320, 332, 123/675, 677, 678, 682, 683; 60/706, 285, 60/286

See application file for complete search history.

(56) References Cited

U.S. PATENT DOCUMENTS

| | | | |
|---|---|---|---|
| 7,603,224 B2 | 10/2009 | Aldrich, III et al. | |
| 7,698,048 B2* | 4/2010 | Jung et al. | 701/103 |
| 7,748,362 B2* | 7/2010 | Whitney et al. | 123/406.23 |
| 7,878,175 B2* | 2/2011 | Livshiz et al. | 123/406.23 |
| 7,885,756 B2* | 2/2011 | Livshiz et al. | 701/105 |
| 2009/0037073 A1* | 2/2009 | Jung et al. | 701/101 |
| 2010/0242933 A1* | 9/2010 | Anilovich et al. | 123/672 |

* cited by examiner

*Primary Examiner* — John Kwon

(57) ABSTRACT

An engine control system comprises a base air per cylinder (APC) module, a catalyst temperature adjustment module, an ambient temperature adjustment module, and an APC adjustment module. The base APC module determines a base APC to reduce first engine pumping losses during a first deceleration fuel cutoff (DFCO) event relative to second engine pumping losses during a second DFCO event. The catalyst temperature adjustment module determines a catalyst temperature adjustment based on a catalyst temperature during the first DFCO event. The ambient temperature adjustment module determines an ambient temperature adjustment based on an ambient air temperature during the first DFCO event. The APC adjustment module selectively adjusts the base APC based on the catalyst temperature adjustment and the ambient temperature adjustment and controls at least one of the engine airflow actuators based on the adjusted base APC during the first DFCO event.

20 Claims, 7 Drawing Sheets

PUMPING LOSS REDUCTION SYSTEMS AND METHODS

CROSS-REFERENCE TO RELATED APPLICATIONS

This application claims the benefit of U.S. Provisional Application No. 61/256,363, filed on Oct. 30, 2009.

This application is related to U.S. Pat. No. 7,603,224, issued Oct. 13, 2009. The disclosures of the above applications are incorporated herein by reference in their entirety.

FIELD

The present disclosure relates to internal combustion engines and more particularly to fuel cutoff systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into spark-ignition engines is regulated via a throttle. More specifically, the throttle adjusts throttle area, which increases or decreases airflow into the engine. As the throttle area increases, the airflow into the engine increases. A fuel control system adjusts the rate that fuel is injected to provide a desired air/fuel mixture to the cylinders. Increasing the amount of air and fuel provided to the cylinders increases the torque output of the engine.

Engine control systems have been developed to control engine output torque to achieve a desired torque. Traditional engine control systems, however, do not control the engine output torque as accurately as desired. Further, traditional engine control systems do not provide a rapid response to control signals or coordinate engine torque control among various devices that affect the engine output torque.

SUMMARY

An engine control system comprises a base air per cylinder (APC) module, a catalyst temperature adjustment module, an ambient temperature adjustment module, and an APC adjustment module. The base APC module determines a base APC to reduce first engine pumping losses during a first deceleration fuel cutoff (DFCO) event relative to second engine pumping losses during a second DFCO event. The catalyst temperature adjustment module determines a catalyst temperature adjustment based on a catalyst temperature during the first DFCO event. The ambient temperature adjustment module determines an ambient temperature adjustment based on an ambient air temperature during the first DFCO event. The APC adjustment module selectively adjusts the base APC based on the catalyst temperature adjustment and the ambient temperature adjustment and controls at least one of the engine airflow actuators based on the adjusted base APC during the first DFCO event.

In other features, the APC adjustment module determines the adjusted base APC based on a product of the base APC, the catalyst temperature adjustment, and the ambient temperature adjustment.

In still other features, the catalyst temperature adjustment module sets the catalyst temperature adjustment to a predetermined value when the catalyst temperature is within a predetermined temperature range and sets the catalyst temperature adjustment to one of greater than and less than the predetermined value when the catalyst temperature is one of greater than and less than the predetermined temperature range.

In further features, the ambient temperature adjustment module sets the ambient temperature adjustment to a predetermined value when ambient air temperature is greater than a predetermined temperature and sets the ambient temperature adjustment to one of greater than and less than the predetermined value when the ambient air temperature is less than the predetermined temperature.

In still further features, the base APC module determines the base APC based on a gear ratio of a transmission and an engine speed.

In other features, the engine control system further comprises a maximum MAP module, a maximum APC module, a desired APC module, and a torque request module. The maximum MAP module determines a maximum MAP during the first DFCO event based on ambient air pressure and a minimum engine vacuum for a brake booster. The maximum APC module determines a maximum APC during the first DFCO event based on the maximum MAP. The desired APC module determines a desired APC to achieve the reduction based on one of the maximum APC and the adjusted base APC. The torque request module controls the at least one engine airflow actuator based on the desired APC.

In still other features, the torque request module adjusts the MAP toward the minimum MAP before the fuel is provided to the engine.

In further features, the torque request module adjusts the MAP toward the minimum MAP when at least one of a torque output capacity of an electric motor is less than a predetermined torque and regeneration capacity is less than a predetermined capacity.

In still further features, the engine control system further comprises a hybrid control module. The hybrid control module controls torque output by an electric motor to achieve a driver torque request while the torque request module adjusts the MAP toward the minimum MAP.

In other features, the engine control system further comprises a DFCO module. The DFCO module selectively initiates the provision of fuel to the engine when a difference between the MAP and the minimum MAP is less than a predetermined difference. The DFCO module determines the difference based on a magnitude of the driver torque request.

An engine control method comprises: determining a base air per cylinder (APC) to reduce first engine pumping losses during a first deceleration fuel cutoff (DFCO) event relative to second engine pumping losses during a second DFCO event, wherein engine airflow actuators are controlled throughout the second DFCO event to achieve a minimum manifold absolute pressure (MAP) for combustion when the second DFCO event ends and fuel is provided to the engine; determining a catalyst temperature adjustment based on a catalyst temperature during the first DFCO event; determining an ambient temperature adjustment based on an ambient air temperature during the first DFCO event; selectively adjusting the base APC based on the catalyst temperature adjustment and the ambient temperature adjustment; and controlling at least one of the engine airflow actuators based on the adjusted base APC during the first DFCO event.

In other features, the engine control method further comprises determining the adjusted base APC based on a product of the base APC, the catalyst temperature adjustment, and the ambient temperature adjustment.

In still other features, the engine control method further comprises setting the catalyst temperature adjustment to a predetermined value when the catalyst temperature is within a predetermined temperature range and setting the catalyst temperature adjustment to one of greater than and less than the predetermined value when the catalyst temperature is one of greater than and less than the predetermined temperature range.

In further features, the engine control method further comprises setting the ambient temperature adjustment to a predetermined value when ambient air temperature is greater than a predetermined temperature and setting the ambient temperature adjustment to one of greater than and less than the predetermined value when the ambient air temperature is less than the predetermined temperature.

In still further features, the engine control method further comprises determining the base APC based on a gear ratio of a transmission and an engine speed.

In other features, the engine control method further comprises determining a maximum manifold absolute pressure (MAP) during the first DFCO event based on ambient air pressure and a minimum engine vacuum for a brake booster, determining a maximum APC during the first DFCO event based on the maximum MAP, determining a desired APC to achieve the reduction based on one of the maximum APC and the adjusted base APC, and controlling the at least one engine airflow actuator based on the desired APC.

In still other features, the engine control method further comprises adjusting the MAP toward the minimum MAP before the fuel is provided to the engine.

In further features, the engine control method further comprises adjusting the MAP toward the minimum MAP when at least one of a torque output capacity of an electric motor is less than a predetermined torque and a regeneration capacity is less than a predetermined capacity.

In still further features, the engine control method further comprises controlling torque output by an electric motor to achieve a driver torque request during the adjusting the MAP toward the minimum MAP.

In other features, the engine control method further comprises selectively initiating the provision of fuel to the engine when a difference between the MAP and the minimum MAP is less than a predetermined difference and determining the difference based on a magnitude of the driver torque request.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
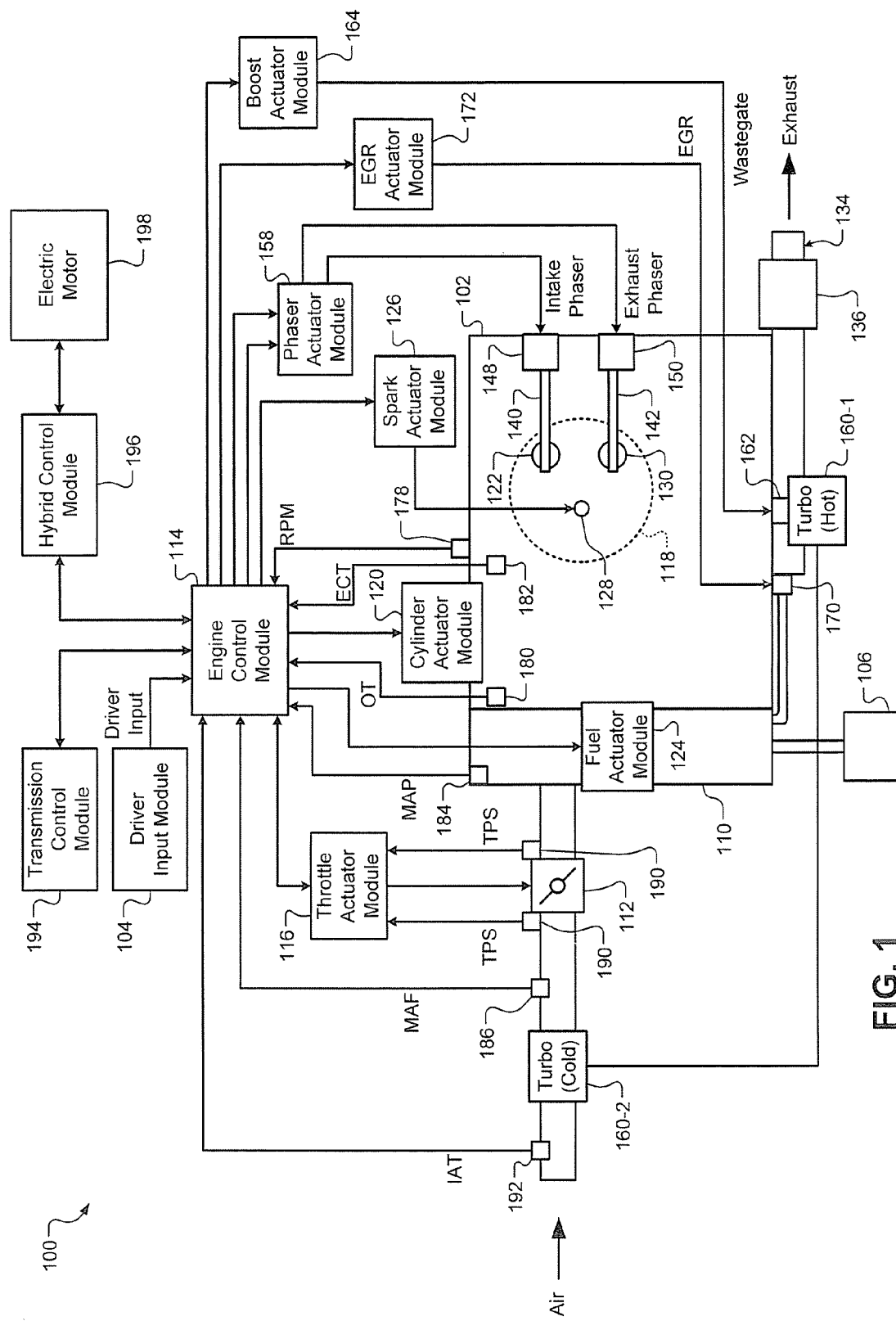
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A controller controls torque output by an internal combustion engine. In some circumstances, the controller may disable provision of fuel to the engine while the vehicle is running, such as during vehicle deceleration. The disablement of the provision of fuel to the engine during vehicle deceleration may be referred to as deceleration fuel cut off (DFCO). The disabling of the provision of fuel to the engine may be performed to, for example, increase fuel economy.

While the provision of fuel is disabled during DFCO, the engine continues to draw air into the engine. The drawing in of air, compression of drawn in air within the engine, and expulsion of the air from the engine may apply a braking (i.e., negative) torque on the engine during DFCO. In other words, torque losses attributable to engine pumping (i.e., pumping losses) occur during DFCO.

The pumping losses may be minimized by adjusting pressure within an intake manifold toward ambient air pressure. Adjusting the manifold pressure toward the ambient air pressure reduces losses associated with drawing air through a throttle valve. Adjusting the manifold pressure toward the ambient air pressure, however, may cause cooling of a catalyst implemented in an exhaust system and insufficient vacuum for a brake booster to assist in performing vehicle braking.

The controller of the present disclosure selectively determines one or more desired airflow parameters to reduce pumping losses sustained during DFCO while ensuring vacuum is present for a brake booster and preventing excess cooling of the catalyst. For example only, the controller may determine a desired APC and a desired MAP. The controller controls one or more engine actuators based on the desired airflow parameters during DFCO. For example only, the controller may control a boost device, a throttle valve, intake and exhaust valves, and other suitable parameters based on the desired airflow parameters during DFCO.

Referring now to FIG. 1, a functional block diagram of an exemplary engine system 100 is presented. The engine system 100 includes an engine 102 that combusts an air/fuel mixture to produce drive torque for a vehicle based on driver input from a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

A brake booster 106 draws vacuum from the intake manifold 110 when the pressure within the intake manifold 110 is less (i.e., is a greater vacuum) than a pressure within the brake booster 106. In other words, the brake booster 106 draws vacuum from the intake manifold 110 when vacuum within the intake manifold 110 is greater than the vacuum within the brake booster 106. The brake booster 106 assists a vehicle user in applying brakes of the vehicle.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cylinder cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. Based on a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. In addition, the spark actuator module 126 may have the ability to vary the timing of the spark for a given firing event even when a change in the timing signal is received after the firing event immediately before the given firing event.

During the combustion stroke, the combustion of the air/fuel mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through an exhaust valve 130. The byproducts of combustion are exhausted from the vehicle via an exhaust system 134. A catalyst 136 receives exhaust gas output by the engine 102 and reacts with various components of the exhaust gas. For example only, the catalyst may include a three-way catalyst (TWC), a catalytic converter, or another suitable exhaust catalyst.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve actuation (not shown) may also be controlled by the phaser actuator module 158.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

The engine system 100 may measure the speed of the crankshaft (i.e., engine speed) in revolutions per minute (RPM) using an RPM sensor 178. Temperature of engine oil may be measured using an oil temperature (OT) sensor 180. Temperature of engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flowrate (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from one or more of the sensors to make control decisions for the engine system 100.

The ECM 114 may communicate with a transmission control module 194 to coordinate shifting gears (and more specifically gear ratio) in a transmission (not shown). For example, the ECM 114 may reduce engine torque during a gear shift. The ECM 114 may communicate with a hybrid control module 196 to coordinate operation (i.e., torque output production) of the engine 102 and an electric motor 198.

The electric motor 198 may also function as a generator, and may be used to produce electrical energy for use by vehicle electrical systems and/or for storage in an energy storage device (e.g., a battery). The production of electrical energy may be referred to as regenerative braking. The electric motor 198 may apply a braking (i.e., negative) torque on the engine 102 to perform regenerative braking and produce electrical energy. The engine system 100 may also include one or more additional electric motors. In various implementations, various functions of the ECM 114, the transmission control module 194, and the hybrid control module 196 may be integrated into one or more modules.

Each system that varies an engine parameter may be referred to as an engine actuator. Each engine actuator receives an associated actuator value. For example, the throttle actuator module 116 may be referred to as an engine actuator and the throttle opening area may be referred to as the associated actuator value. In the example of FIG. 1, the throttle actuator module 116 achieves the throttle opening area by adjusting an angle of the blade of the throttle valve 112.

Similarly, the spark actuator module 126 may be referred to as an engine actuator, while the associated actuator value may be the amount of spark advance relative to cylinder TDC. Other actuators may include the cylinder actuator module 120, the fuel actuator module 124, the phaser actuator module 158, the boost actuator module 164, and the EGR actuator module 172. For these engine actuators, the associated actuator values may include to number of activated cylinders, fueling rate, intake and exhaust cam phaser angles, boost pressure, and EGR valve opening area, respectively. The ECM 114 may control actuator values in order to cause the engine 102 to generate a desired engine output torque.

Figure 2:
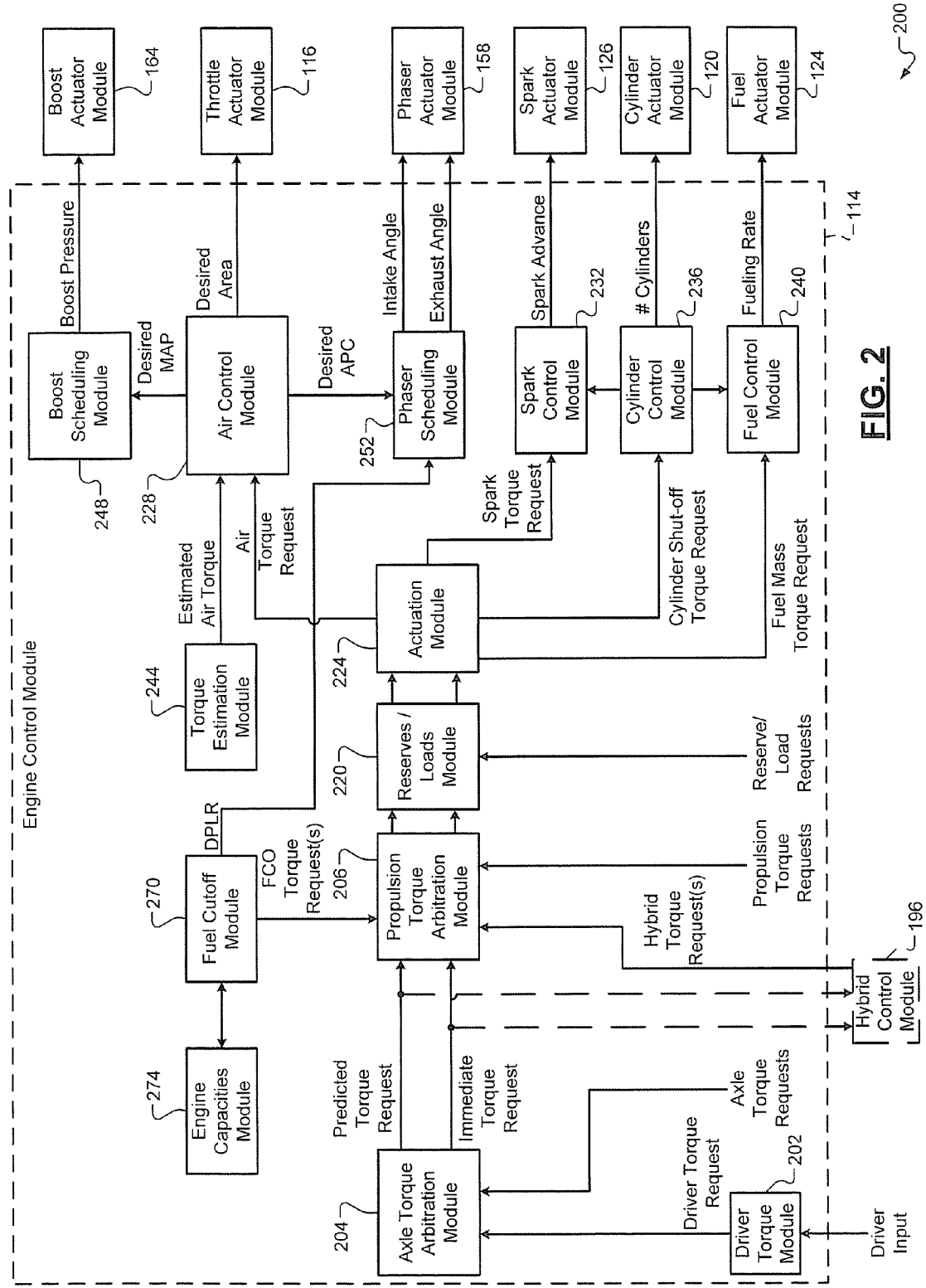
FIG. 2 is a functional block diagram of an exemplary engine control system according to the principles of the present disclosure.

Referring now to FIG. 2, a functional block diagram of an exemplary engine control system 200 is presented. An exemplary implementation of the ECM 114 includes a driver torque module 202. The driver torque module 202 may determine a driver torque request based on driver input(s) from the driver input module 104. The driver input may be based on a position of an accelerator pedal. The driver input may also be based on cruise control, which may be an adaptive cruise control system that varies vehicle speed to maintain a predetermined following distance. The driver torque module 202 may store one or more mappings of accelerator pedal position to driver torque request, and may determine the driver torque request based on a selected one of the mappings.

An axle torque arbitration module 204 arbitrates between the driver torque request from the driver torque module 202 and other axle torque requests. Torque requests may include absolute torque requests as well as relative torque requests and ramp requests. For example only, ramp requests may include a request to ramp torque down to a minimum engine off torque or to ramp torque up from the minimum engine off torque. Relative torque requests may include temporary or persistent torque reductions or increases. Each torque request may include data indicating the system or module that generated that torque request (i.e., the requestor).

Axle torque requests may include a torque reduction requested by a traction control system when positive wheel slip is detected. Positive wheel slip occurs when axle torque overcomes friction between the wheels and the road surface, and the wheels begin to slip against the road surface in a forward direction. Axle torque requests may also include a torque increase request to counteract negative wheel slip, where a tire of the vehicle slips in a reverse direction with respect to the road surface because the axle torque is negative.

Axle torque requests may also include brake management requests and vehicle over-speed torque requests. Brake management requests may reduce the engine output torque to ensure that the engine output torque does not exceed the ability of the brakes to hold the vehicle when the vehicle is stopped. Vehicle over-speed torque requests may reduce the engine output torque to prevent the vehicle from exceeding a predetermined speed. Axle torque requests may also be generated by vehicle stability control systems.

The axle torque arbitration module 204 outputs a predicted torque request and an immediate torque request based on the results of arbitrating between the received torque requests. As described below, the predicted and immediate torque requests from the axle torque arbitration module 104 may selectively be adjusted by other modules before being used to control actuators of the engine 102.

In general terms, the immediate torque request is the amount of currently desired engine output torque, while the predicted torque request is the amount of engine output torque that may be needed on short notice. The ECM 114 therefore controls the engine 102 to produce an engine output torque equal to the immediate torque request. However, different combinations of actuator values may result in the same engine output torque. The ECM 114 may therefore control the actuator values to allow a faster transition to the predicted torque request, while still maintaining the engine output torque at the immediate torque request.

In various implementations, the predicted torque request may be based on the driver torque request. The immediate torque request may be less than the predicted torque request, such as when the driver torque request is causing positive wheel slip on an icy surface. In such a case, a traction control system (not shown) may request a reduction via the immediate torque request, and the ECM 114 reduces the torque produced by the engine 102 to the immediate torque request. However, the ECM 114 controls the engine actuators so that the engine 102 can quickly resume producing the predicted torque request once the positive wheel slip stops.

In general terms, the difference between the immediate torque request and the predicted torque request can be referred to as a torque reserve. The torque reserve represents the amount of torque more than the immediate torque request that the engine 102 can begin to produce with minimal delay. Fast engine actuators are used to increase or decrease the engine output torque. As described in more detail below, fast engine actuators are defined based on their ability to produce a response in the engine output torque relative to slow engine actuators.

In various implementations, fast engine actuators are capable of varying engine output torque within a range, where the range is established by the slow engine actuators. In such implementations, the upper limit of the range is the predicted torque request, while the lower limit of the range is limited by the torque capacity of the fast engine actuators.

For example only, fast engine actuators may only be able to reduce engine output torque by a first amount, where the first amount is a measure of the torque capacity of the fast actuators. The first amount may vary based on engine operating conditions set by the slow engine actuators. When the immediate torque request is within the range, fast engine actuators can be set to cause the engine output torque to be equal to the immediate torque request. When the ECM 114 requests the predicted torque request to be output, the fast engine actuators can be controlled to vary the engine output torque to the upper limit of the range, which is the predicted torque request.

In general terms, fast engine actuators can change the engine output torque more quickly than slow engine actuators can. Slow engine actuators may respond more slowly to changes in their respective actuator values than fast engine actuators do. For example, a slow engine actuator may include mechanical components that require time to move from one position to another in response to a change in the associated actuator value.

A slow engine actuator may also be characterized by the amount of time it takes for the engine output torque to begin to change once the slow engine actuator begins to implement the changed actuator value. Generally, this amount of time will be longer for slow engine actuators than for fast engine actuators. In addition, even after the engine output torque begins to change, the engine output torque may take longer to reach an engine output torque that is expected to result from the changed actuator value.

For example only, the ECM 114 may set actuator values for slow engine actuators to values that would enable the engine 102 to produce the predicted torque request if the fast engine actuators were set to appropriate values. Meanwhile, the ECM 114 may set actuator values for fast engine actuators to values that, given the slow actuator values, cause the engine 102 to produce the immediate torque request instead of the predicted torque request.

The fast actuator values therefore cause the engine 102 to produce the immediate torque request. When the ECM 114 decides to transition the engine output torque from the immediate torque request to the predicted torque request, the ECM 114 changes the actuator values associated with one or more fast engine actuators to values that correspond to the predicted torque request. Because the actuator values associated with the slow engine actuators have already been set based on the predicted torque request, the engine 102 is able to produce the predicted torque request after only the delay attributable to the fast engine actuators. In other words, the longer delay that would otherwise result from changing engine output torque using slow engine actuators is avoided.

For example only, when the predicted torque request is equal to the driver torque request, a torque reserve may be created when the immediate torque request is less than the drive torque request due to a temporary torque reduction request. Alternatively, a torque reserve may be created by increasing the predicted torque request above the driver torque request while maintaining the immediate torque request at the driver torque request.

The resulting torque reserve can be used to offset sudden increases in required engine output torque. For example only, sudden loads from an air conditioner or a power steering pump may be offset by increasing the immediate torque request. If the increase in immediate torque request is less than the torque reserve, the increase can be quickly produced by using fast engine actuators. The predicted torque request may then also be increased to re-establish the previous torque reserve.

Another exemplary use of a torque reserve is to reduce fluctuations in slow actuator values. Because of their relatively slow speed, varying slow actuator values may produce control instability. In addition, slow engine actuators may include mechanical parts, which may draw more power and/or wear more quickly when moved frequently.

Creating a sufficient torque reserve allows changes in desired torque to be made by varying fast engine actuators via the immediate torque request while maintaining the values of the slow engine actuators. For example only, to maintain a given idle speed, the immediate torque request may vary within a range. If the predicted torque request is set to a level above this range, variations in the immediate torque request that maintain the idle speed can be made using fast engine actuators without the need to adjust slow engine actuators.

For example only, in a spark-ignition engine, spark timing may be a fast actuator value, while throttle opening area may be a slow actuator value. Spark-ignition engines may combust fuels including, for example, gasoline and ethanol, by applying a spark. By contrast, a compression-ignition engine may combust fuels including, for example, diesel, by compressing the fuels.

After receiving a new actuator value, the spark actuator module 126 may be able to change spark timing for the following firing event. When the spark timing (also called spark advance) for a firing event is set to a calibrated value, a maximum torque is produced in the combustion stroke immediately following the firing event.

However, a spark advance deviating from the calibrated value may reduce the amount of torque produced in the combustion stroke. Therefore, the spark actuator module 126 may be able to vary engine output torque as soon as the next firing event occurs by varying the spark timing. For example only, a table of spark timings corresponding to different engine operating conditions may be determined during a calibration phase of vehicle design, and the calibrated value is selected from the table based on current engine operating conditions.

By contrast, changes in throttle opening area take longer to affect the engine output torque. The throttle actuator module 116 changes the throttle opening area by adjusting the angle of the blade of the throttle valve 112. Therefore, once a new actuator value is received, there is a mechanical delay as the throttle valve 112 moves from its previous position to a new position based on the new actuator value. In addition, airflow changes based on the throttle valve opening are subject to air transport delays in the intake manifold 110. Further, increased airflow into the intake manifold 110 is not realized as an increase in engine output torque until the cylinder 118 receives additional air in the next intake stroke, compresses the additional air, and commences the combustion stroke.

Using the throttle opening area and the spark timing in an example, a torque reserve can be created by setting the throttle opening area to a value that would allow the engine 102 to produce a predicted torque request. Meanwhile, the spark timing can be set based on an immediate torque request that is less than the predicted torque request. Although the throttle opening area generates enough airflow for the engine 102 to produce the predicted torque request, the spark timing is retarded (which reduces the engine output torque) based on the immediate torque request. The engine output torque will therefore be equal to the immediate torque request.

When additional torque is needed, such as when the air conditioning compressor is engaged, or when traction control determines that wheel slip has ended, the spark timing can be set based on the predicted torque request. By the following firing event, the spark actuator module 126 may return the spark timing to a calibrated value, which allows the engine 102 to produce the maximum engine output torque. The engine output torque may therefore be quickly increased to the predicted torque request without experiencing delays from changing the throttle opening area.

The axle torque arbitration module 204 may output the predicted torque request and the immediate torque request to a propulsion torque arbitration module 206. Depending on the type of hybrid vehicle, the axle torque arbitration module 204 may output the predicted and immediate torque requests to the hybrid control module 196.

The predicted and immediate torque requests received by the propulsion torque arbitration module 206 are converted from an axle torque domain (torque at the wheels) into a propulsion torque domain (torque at the crankshaft). In some implementations, the predicted and immediate torque requests may be converted into the propulsion torque domain before being provided to the propulsion torque arbitration module 206. In some implementations, the predicted and immediate torque requests in the propulsion torque domain may be provided to the hybrid control module 196. The hybrid control module 196 may control the electric motor 198 based on one or more of the torque requests and may provide modified predicted and immediate torque requests to the propulsion torque arbitration module 206.

The propulsion torque arbitration module 206 arbitrates between propulsion torque requests, including the converted predicted and immediate torque requests. The propulsion torque arbitration module 206 generates an arbitrated predicted torque request and an arbitrated immediate torque request based on the arbitration. The arbitrated torque requests may be generated by selecting a winning request from among received requests. Alternatively or additionally, the arbitrated torque requests may be generated by modifying one of the received requests based on another one or more of the received requests.

Other propulsion torque requests may include torque reductions for engine over-speed protection, torque increases for stall prevention, and torque reductions requested by the transmission control module 194 to accommodate gear shifts. The other propulsion torque requests may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated torques.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other requestors may be informed that they have lost arbitration.

A reserves/loads module 220 receives the arbitrated predicted and immediate torque requests from the propulsion torque arbitration module 206. The reserves/loads module 220 may adjust the arbitrated predicted and immediate torque requests to create a torque reserve and/or to compensate for one or more loads. The reserves/loads module 220 then outputs the adjusted predicted and immediate torque requests to an actuation module 224.

The actuation module 224 receives the predicted and immediate torque requests from the reserves/loads module 220. The actuation module 224 determines how the predicted and immediate torque requests will be achieved. The actuation module 224 may be engine type specific. For example, the actuation module 224 may be implemented differently or use different control schemes for spark-ignition engines versus compression-ignition engines.

In various implementations, the actuation module 224 may define a boundary between modules that are common across all engine types and modules that are engine type specific. For example, engine types may include spark-ignition and compression-ignition. Modules prior to the actuation module 224, such as the propulsion torque arbitration module 206, may be common across engine types, while the actuation module 224 and subsequent modules may be engine type specific.

For example, in a spark-ignition engine, the actuation module 224 may vary the opening of the throttle valve 112 as a slow engine actuator that allows for a wide range of torque control. The actuation module 224 may disable cylinders using the cylinder actuator module 120, which also provides for a wide range of torque control, but may also be slow and may involve drivability and emissions concerns. The actuation module 224 may use spark timing as a fast engine actuator. However, spark timing may not provide as much range of torque control. In addition, the amount of torque control possible with changes in spark timing (referred to as spark reserve capacity) may vary as one or more airflow conditions change.

In various implementations, the actuation module 224 may generate an air torque request based on the predicted torque request. The air torque request may be equal to the predicted torque request, thereby controlling engine airflow actuators so that the adjusted predicted torque request can be rapidly achieved by adjusting one or more actuator values associated with fast engine actuators.

An air control module 228 may determine desired actuator values for the engine airflow actuators based on the air torque request. For example, the air control module 228 may determine a desired manifold absolute pressure (MAP), a desired throttle area, and/or a desired air per cylinder (APC). The desired MAP may be used to determine desired boost, and the desired APC may be used to determine desired cam phaser positions. In various implementations, the air control module

228 may also determine a desired opening of the EGR valve 170 and other engine airflow parameters.

The actuation module 224 may also generate a spark torque request, a cylinder shut-off torque request, and a fuel mass torque request. For example only, the actuation module 224 may generate the spark torque request, the cylinder shut-off torque request, and/or the fuel mass torque request based on the immediate torque request.

The actuation module 224 may generate one or more of these requests based on the requestor. An exemplary illustration of when the actuation module 224 may generate one of these torque requests based on the requestor is when a fuel cutoff module 270 generates an immediate torque request for disabling the provision of fuel to the engine 102. The fuel cutoff module 270 is discussed further below.

The spark torque request may be used by a spark control module 232 to determine how much to retard the spark timing (which reduces the engine output torque) from a calibrated spark advance. The cylinder shut-off torque request may be used by a cylinder control module 236 to determine how many cylinders to deactivate. The cylinder control module 236 may instruct the cylinder actuator module 120 to deactivate one or more cylinders of the engine 102. In various implementations, a predefined group of cylinders may be deactivated jointly.

The cylinder control module 236 may also instruct a fuel control module 240 to stop providing fuel for deactivated cylinders and may instruct the spark control module 232 to stop providing spark for deactivated cylinders. In various implementations, the spark control module 232 only stops providing spark for a cylinder once any fuel/air mixture already present in the cylinder has been combusted.

In various implementations, the cylinder actuator module 120 may include a hydraulic system that selectively decouples intake and/or exhaust valves from the corresponding camshafts for one or more cylinders in order to deactivate those cylinders. For example only, valves for half of the cylinders are either hydraulically coupled or decoupled as a group by the cylinder actuator module 120. In various implementations, cylinders may be deactivated simply by halting provision of fuel to those cylinders, without stopping the opening and closing of the intake and exhaust valves. In such implementations, the cylinder actuator module 120 may be omitted.

The fuel control module 240 may vary the amount of fuel provided to each cylinder based on the fuel mass torque request from the actuation module 224. During normal operation of a spark-ignition engine, the fuel control module 240 may attempt to maintain a stoichiometric air/fuel ratio. The fuel control module 240 may therefore determine a fuel mass that will yield stoichiometric combustion when combined with the current APC. The fuel control module 240 may instruct the fuel actuator module 124 to inject this fuel mass for each activated cylinder.

Based on the fuel mass torque request, the fuel control module 240 may adjust the air/fuel ratio with respect to stoichiometry to increase or decrease engine output torque. The fuel control module 240 may then determine a fuel mass for each cylinder that achieves the desired air/fuel ratio. In diesel systems, fuel mass may be the primary actuator for controlling engine output torque. During fuel cutoff, the actuation module 224 may generate the fuel mass torque request such that the fuel control module 240 disables the provision of fuel to the engine 102.

A torque estimation module 244 may estimate torque output of the engine 102. This estimated torque may be used by the air control module 228 to perform closed-loop control of the engine airflow parameters, such as the throttle area, the MAF, the MAP, the APC, and the phaser positions. For example only, a torque relationship such as:

$$T = f(APC, S, I, E, AF, OT, \#) \qquad (1)$$

may be defined, where torque (T) is a function of mass of air per cylinder (APC), spark advance (S), intake cam phaser position (I), exhaust cam phaser position (E), air/fuel ratio (AF), oil temperature (OT), and number of activated cylinders (#). Additional variables may also be accounted for, such as the degree of opening of an exhaust gas recirculation (EGR) valve.

This relationship may be modeled by an equation and/or may be stored as a lookup table. The torque estimation module 244 may determine the APC based on the MAF and the RPM, thereby allowing closed-loop control of the engine airflow parameters control based on current engine airflow conditions. The intake and exhaust cam phaser positions used may be based on actual positions, as the phasers may be traveling toward desired positions.

The torque estimation module 244 may use the actual spark advance to estimate the engine output torque. When a calibrated spark advance value is used to estimate the engine output torque, the estimated torque may be called an estimated air torque, or simply air torque. The air torque is an estimate of how much torque the engine 102 could generate with the current airflow conditions if spark retard was removed (i.e., spark timing was set to the calibrated spark advance value) and all cylinders were fueled.

The air control module 228 may output a desired area signal to the throttle actuator module 116. The throttle actuator module 116 then regulates the throttle valve 112 to produce the desired throttle area. The air control module 228 may generate the desired area signal based on an inverse torque model and the air torque request. The air control module 228 may use the estimated air torque and/or the MAF signal in order to perform closed-loop control of the engine airflow actuators. For example, the desired area signal may be controlled to minimize a difference between the estimated air torque and the air torque request.

The air control module 228 may output a desired MAP signal to a boost scheduling module 248. The boost scheduling module 248 may use the desired MAP signal to control the boost actuator module 164. The boost actuator module 164 then controls one or more turbochargers (e.g., the turbocharger including the turbine 160-1 and the compressor 160-2) and/or superchargers. The desired MAP may also be used by the throttle actuator module 116 in controlling the throttle valve 112.

The air control module 228 may also output a desired air per cylinder (APC) signal to a phaser scheduling module 252. Based on the desired APC signal and the RPM signal, the phaser scheduling module 252 may control positions of the intake and/or exhaust cam phasers 148 and 150 using the phaser actuator module 158.

Referring back to the spark control module 232, calibrated spark advance values may vary based on various engine operating conditions. For example only, a torque relationship may be inverted to solve for desired spark advance. For a given torque request ($T_{des}$), the desired spark advance ($S_{des}$) may be determined based on $$S_{des} = T^{-1}(T_{des}, APC, I, E, AF, OT, \#). \qquad (2)$$

This relationship may be embodied as an equation and/or as a lookup table. The air/fuel ratio (AF) may be the actual air/fuel ratio, as reported by the fuel control module 240.

When the spark advance is set to the calibrated spark advance, the resulting torque may be as close to a mean best torque (MBT) as possible. MBT refers to the maximum engine output torque that is achievable for a given engine airflow conditions as spark advance is increased, while using fuel having an octane rating greater than a predetermined octane rating and using stoichiometric fueling. The spark advance at which the MBT occurs is referred to as MBT spark timing. The calibrated spark advance may differ slightly from MBT spark timing because of, for example, fuel quality (such as when lower octane fuel is used) and environmental factors. The engine output torque produced using the calibrated spark advance may therefore be less than the MBT.

The fuel cutoff module 270 selectively generates propulsion torque requests for fuel cutoff (FCO) events. For example only, the fuel cutoff module 270 may generate propulsion torque requests to initiate and to control performance of clutch fuel cutoff (CFCO) events and deceleration fuel cutoff (DFCO) events. The fuel cutoff module 270 may also generate propulsion torque requests for other types of FCO events.

The fuel cutoff module 270 may generate a FCO predicted torque request and a FCO immediate torque request. When received, the propulsion torque arbitration module 206 may select the FCO torque requests from the fuel cutoff module 270 as winning the arbitration. In this manner, the engine actuators are controlled based on the FCO torque requests during FCO events.

In some hybrid vehicles, the fuel cutoff module 270 may receive a hybrid immediate torque request from the hybrid control module 196. The fuel cutoff module 270 may generate the FCO immediate torque request based on the hybrid immediate torque request. In other hybrid vehicles, the hybrid control module 196 may provide the hybrid immediate torque request directly to the propulsion torque arbitration module 206. In such implementations, the propulsion torque arbitration module 206 may select the predicted torque request from the fuel cutoff module 270 and the hybrid immediate torque request from the hybrid control module 196 as winning the arbitration. The engine actuators are then controlled based on these torque requests.

An engine capacities module 274 may determine one or more torque capacities of the engine 102. For example only, the engine capacities module 274 may determine a maximum off torque capacity and a minimum off torque capacity. The engine capacities module 274 may also determine one or more other engine torque capacities.

The maximum off torque capacity may correspond to a maximum engine output torque achievable with the provision of fuel disabled and the engine airflow actuators adjusted to minimize pumping losses during DFCO. In other words, controlling the engine airflow actuators based on the maximum off torque capacity may achieve a maximum reduction in pumping loss during DFCO.

The minimum off torque capacity may correspond to a minimum engine output torque achievable with the provision of fuel disabled and the engine actuators adjusted to maximize the pumping losses during DFCO. In other words, controlling the engine airflow actuators based on the minimum off torque capacity may provide zero reduction in the pumping losses sustained during DFCO. In some implementations, the minimum off torque capacity and the maximum off torque capacity may be provided to the hybrid control module 196.

The engine capacities module 274 may determine the maximum off torque capacity and the minimum off torque capacity based on the RPM, rubbing friction, and accessory loads applying a braking (i.e., negative) torque to the engine 102. The rubbing friction may be determined based on the oil temperature. The accessory loads may be imposed by, for example, the power steering pump, the air conditioning (NC) compressor, and/or other suitable loads.

The minimum off torque capacity may be determined further based on a minimum APC for combustion, and the maximum off torque capacity may be determined further based on a desired MAP or a desired APC. The fuel cutoff module 270 may provide the desired MAP and/or the desired APC during DFCO. The fuel cutoff module 270 may determine the desired MAP and the desired APC to achieve a pumping loss reduction during DFCO. In other words, the fuel cutoff module 270 may determine the desired MAP and the desired APC to achieve a DFCO pumping loss reduction (DPLR). The determination of this desired MAP and APC to achieve DPLR is discussed in detail below with respect to the exemplary embodiment of FIG. 4.

The fuel cutoff module 270 may provide a DPLR signal to the phaser scheduling module 252 when DPLR is to be performed. During DPLR, the phaser scheduling module 252 may control valve timing of the intake and exhaust valves 122 and 130 to minimize valve opening overlap. Valve opening overlap may describe a period during which both the intake valve 122 and the exhaust valve 130 are open. Intake and exhaust cam phaser angles to minimize valve opening overlap, and thereby minimize pumping losses, may be predetermined and may be selected based on the operating conditions. When the DPLR signal is not received, the phaser scheduling module 252 may adjust the timing of the intake and exhaust valves 122 and 130 based on the air torque request. For example only, during DFCO, the phaser scheduling module may eliminate valve opening overlap when the DPLR signal is not received.

Figure 3A:
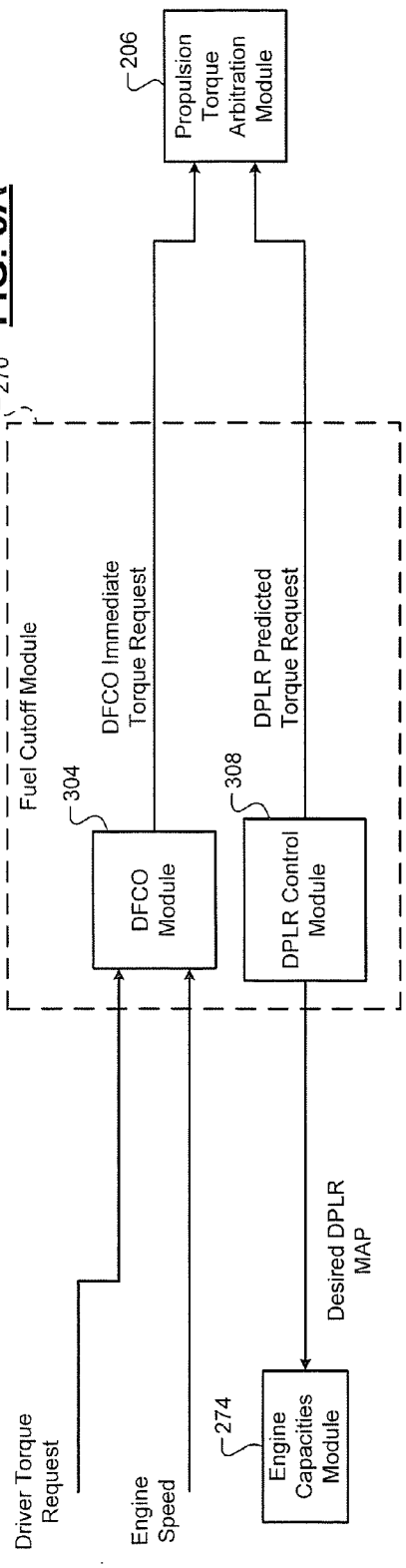
FIGS. 3A-3B are functional block diagrams of exemplary deceleration fuel cutoff pumping loss reduction (DPLR) control systems according to the principles of the present disclosure.

Referring now to FIG. 3A, a functional block diagram of an exemplary DPLR system 300 is presented. The exemplary DPLR system 300 may be included, for example, in a non-hybrid vehicle. The fuel cutoff module 270 may include a DFCO module 304 and a DPLR control module 308.

The DFCO module 304 may selectively initiate DFCO based on various operating parameters. The DFCO module 304 may selectively initiate DFCO based on, for example, the engine speed, the driver torque request, and state of charge of the energy storage device. The DFCO module 304 may selectively initiate DFCO based on one or more other suitable parameters.

For example only, in non-hybrid vehicles, the DFCO module 304 may initiate DFCO when the engine speed is greater than a predetermined speed, the driver torque request is less than a predetermined torque, and the state of charge is greater than a predetermined state of charge. Written conversely, the DFCO module 304 may prevent the initiation of DFCO when the engine speed is less than the predetermined speed, when the driver torque request is greater than the predetermined torque, or when the state of charge is less than the predetermined state of charge.

The DFCO module 304 may generate a DFCO immediate torque request to initiate DFCO. The DFCO module 304 may also control the DFCO immediate torque request during DFCO. The DFCO module 304 may generate a DECO signal and provide the DECO signal to the DPLR control module 308 when the provision of fuel to the engine 102 (i.e., all of the cylinders) has been disabled.

The DPLR control module 308 may determine a desired DPLR MAP and a desired DPLR APC. The desired DPLR MAP may be provided to the engine capacities module 274, and the engine capacities module 274 may determine the maximum off torque capacity based on the desired DPLR MAP. The determination of the desired DPLR MAP and the desired DPLR APC is discussed further below in the context of the exemplary embodiment of FIG. 4.

When the provision of fuel to the engine 102 has been disabled, the DPLR control module 308 may determine the DPLR predicted torque request based on the desired DPLR APC. The fuel cutoff module 270 provides the DECO immediate torque request and/or the DPLR predicted torque request to the propulsion torque arbitration module 206. The propulsion torque arbitration module 206 selects the torque requests from the fuel cutoff module 270 as winning the arbitration. Accordingly, the provision of fuel to the engine 102 is disabled based on the DECO immediate torque request. The engine airflow actuators may be controlled based on the DPLR predicted torque request, and the intake and exhaust cam phaser angles may be controlled to minimize valve opening overlap. In this manner, a reduction in the pumping losses that would otherwise be sustained during DECO may be achieved.

The DPLR control module 308 may generate a DPLR signal that indicates whether DPLR is being performed. In other words, the DPLR control module 308 may generate the DPLR signal that indicates whether one or more of the engine airflow actuators are being controlled to reduce the pumping losses. For example only, the DPLR control module 308 may set the DPLR signal to an active state (e.g., 5 V) when DPLR is being performed.

The DPLR control module 308 may provide the DPLR signal to the DFCO module 304. When DFCO is to be disabled, the DPLR control module 308 may control the engine airflow actuators to adjust the MAP toward the minimum MAP before the provision of fuel to the engine 102 is resumed. The DPLR control module 308 may set the DPLR signal to an inactive state (e.g., 0 V) when the MAP has been sufficiently adjusted toward the minimum MAP. The DECO module 304 may wait for the DPLR signal to reach the inactive state before resuming the provision of fuel to the engine 102.

Figure 3B:
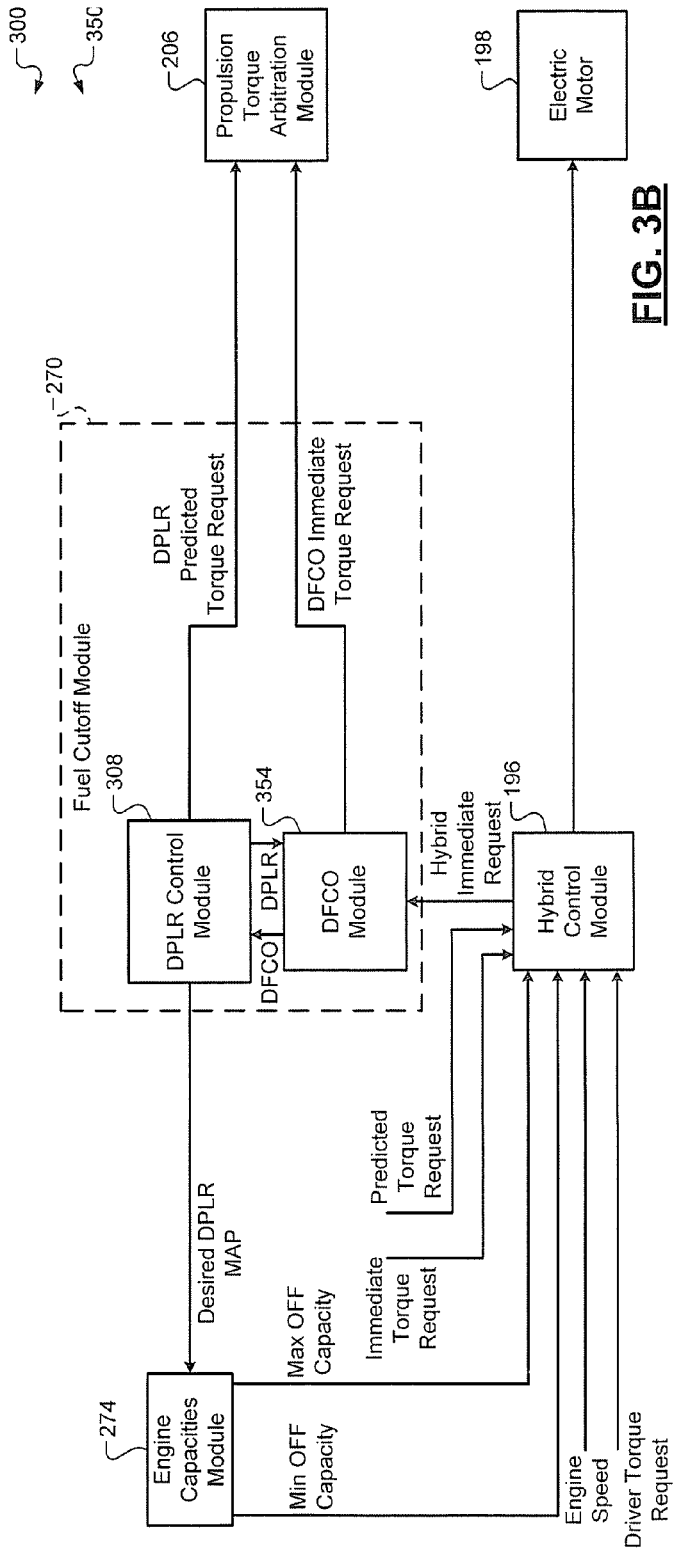

Referring now to FIG. 3B, a functional block diagram of another exemplary DPLR system 350 is presented. The exemplary DPLR system 350 may be included, for example, in a hybrid vehicle. The fuel cutoff module 270 may include a DECO module 354 and the DPLR control module 308.

The hybrid control module 196 may receive the predicted and immediate torque requests and determine how much torque should be produced by the engine 102 and how much torque should be produced by the electric motor 198. In hybrid vehicles where the electric motor 198 is mechanically coupled to the crankshaft, for example, by a belt (e.g., a belt alternator starter), the hybrid control module 196 may determine how to achieve the predicted and immediate torque requests using the engine 102 and the electric motor 198. In hybrid vehicles where the electric motor 198 is mechanically linked to the transmission, the hybrid control module 196 may determine how to use the combination of gear ratio, the engine 102, and the electric motor 198 to achieve the predicted and immediate torque requests.

The hybrid control module 196 may control the electric motor 198 based on the torque that should be produced by the electric motor 198. In this manner, the hybrid control module 196 may optimize the operation of the engine 102 and the electric motor 198. The hybrid control module 196 may output modified predicted and/or immediate torque requests to the propulsion torque arbitration module 206.

The hybrid control module 196 may determine whether to initiate DFCO. For example only, the hybrid control module 196 may determine whether to initiate DFCO based on the engine speed, the driver torque request, state of charge of the energy storage device, and/or one or more other suitable parameters.

The hybrid control module 196 may initiate DFCO when, for example, the engine speed is greater than the predetermined speed, the driver torque request is less than the predetermined torque, and the state of charge is greater than the predetermined state of charge. Written conversely, the hybrid control module 196 may prevent the initiation of DFCO when the engine speed is less than the predetermined speed, when the driver torque request is greater than the predetermined torque, or when the state of charge is less than the predetermined state of charge. The hybrid control module 196 may generate the hybrid immediate torque request to initiate DFCO, and the hybrid control module 196 may control the generation of the hybrid immediate torque request during DFCO.

The DFCO module 354 may generate the DFCO immediate torque request based on the hybrid immediate torque request. The DFCO module 354 may also selectively modify the hybrid immediate torque request before providing the DFCO immediate torque request to propulsion torque arbitration module 206. The DFCO module 354 may selectively modify the hybrid immediate torque request, for example, to ensure that the provision of fuel to the engine 102 has been disabled or enabled in steady-state.

For example only, the DFCO module 354 may filter, buffer, shape, and/or apply another suitable hysterysis modification. The modification of the hybrid immediate torque request may be performed, for example, to remediate a delay present between the determination of the maximum and minimum off torque capacities and the provision of the resulting hybrid immediate torque request to the propulsion torque arbitration module 206. This delay may be attributable to the determination of the maximum and minimum off torque capacities and provision to the hybrid control module 196 during a first control loop, the determination of the hybrid immediate torque request and provision of the hybrid immediate torque request to the ECM 114 during a second control loop, and the provision of the hybrid immediate torque request to the propulsion torque arbitration module 206 during a third control loop.

The hybrid control module 196 may also determine whether to achieve a pumping loss reduction during DFCO. In other words, the hybrid control module 196 may selectively initiate DPLR during DFCO. The reduction in pumping losses may be relative to the maximum pumping losses sustained when controlling the engine airflow actuators to maintain the MAP at approximately the minimum MAP.

Generally, the hybrid control module 196 may determine that DPLR should be performed during DFCO. However, the hybrid control module 196 may determine that DPLR should not be achieved, for example, when: (1) torque output capacity of the electric motor 198 is insufficient; and/or (2) regeneration capacity is low.

The torque output capacity of the electric motor 198 may be said to be insufficient when the state of charge of the energy storage device is low, when temperature of the electric motor 198 is greater than a predetermined maximum operating temperature, when temperature of the energy storage device less than a predetermined temperature, and/or under other circumstances when the electric motor 198 may be unable to achieve the predicted torque request. The engine 102 also cannot achieve the predicted torque request during this time as the provision of fuel is disabled. Further, resuming of the provision of fuel may be delayed in order to adjust the MAP toward the minimum MAP. The regeneration capacity may be said to be low when the state of charge is near a maximum state of charge, when the temperature of the electric motor 198 is greater than the predetermined maximum operating temperature, when the temperature of the energy storage device is less than the predetermined temperature, and/or under other circumstances when regenerative braking may be unnecessary.

The hybrid control module 196 may communicate whether DPLR is to be performed during DFCO using the hybrid immediate torque request. The DFCO module 354 may receive the indication and may selectively enable and disable the DPLR control module 308 based on the indication.

In other implementations, the ECM 114 may infer whether DPLR is to be performed during DFCO based on a comparison of the hybrid immediate torque request with the maximum and minimum off torque capacities. For example only, the ECM 114 may infer that DPLR is to be performed when the hybrid immediate torque request is equal to the maximum off torque capacity.

When DPLR is to be performed, the DPLR control module 308 may determine the DPLR predicted torque request based on the desired DPLR APC. Ultimately, the engine airflow actuators may be controlled based on the DPLR predicted torque request, and the intake and exhaust cam phaser angles may be controlled to minimize valve opening overlap.

In some implementations, the hybrid control module 196 may communicate how much pumping loss reduction should be achieved. For example only, the hybrid control module 196 may communicate a scalar value that may vary between 1.0 and 0.0, inclusive. The DPLR control module 308 may generate the DPLR predicted torque request to achieve the maximum reduction in pumping losses when the scalar value is 1.0 and may generate the DPLR predicted torque request to achieve zero reduction in pumping losses when the scalar value is 0.0.

When DPLR is being performed during DFCO, the hybrid control module 196 may selectively request that DPLR and DFCO be disabled when the torque output capacity of the electric motor 198 is insufficient and/or when the regeneration capacity is low. When it is requested that DPLR and DFCO be disabled, DPLR is disabled first so the engine airflow actuators may be controlled to adjust the MAP toward the minimum MAP before the provision of fuel is resumed. The minimum MAP may correspond to a minimum MAP at which combustion may be achieved without engine misfire when the provision of fuel is resumed. For example only, the minimum MAP may be approximately 20 kPa for an exemplary engine at a predetermined ambient temperature and a predetermined ambient pressure.

The magnitude of vibration experienced when the provision of fuel is resumed is related to how close the MAP is to the minimum MAP when the provision of fuel is resumed. For example only, the magnitude of the vibration may decrease as the MAP approaches the minimum MAP. Accordingly, a minimum vibration may be experienced when the MAP is equal to the minimum MAP as the provision of fuel is resumed.

While the MAP is being adjusted toward the minimum MAP, the hybrid control module 196 may control the electric motor 198 to offset the difference between the driver torque request and the engine output torque. In this manner, a delay is not experienced between actuation of the accelerator pedal and when the engine output torque is produced while the MAP is being adjusted toward the minimum MAP.

Under some circumstances, the hybrid control module 196 may command the ECM 114 to resume the provision of fuel before the MAP reaches the minimum MAP. For example only, the hybrid control module 196 may command the ECM 114 to resume fueling before the MAP reaches the minimum MAP when the driver torque request is large. How far before the MAP reaches the minimum MAP the hybrid control module 196 commands the ECM to resume fueling may be determined based on the magnitude of the driver torque request.

Figure 4:
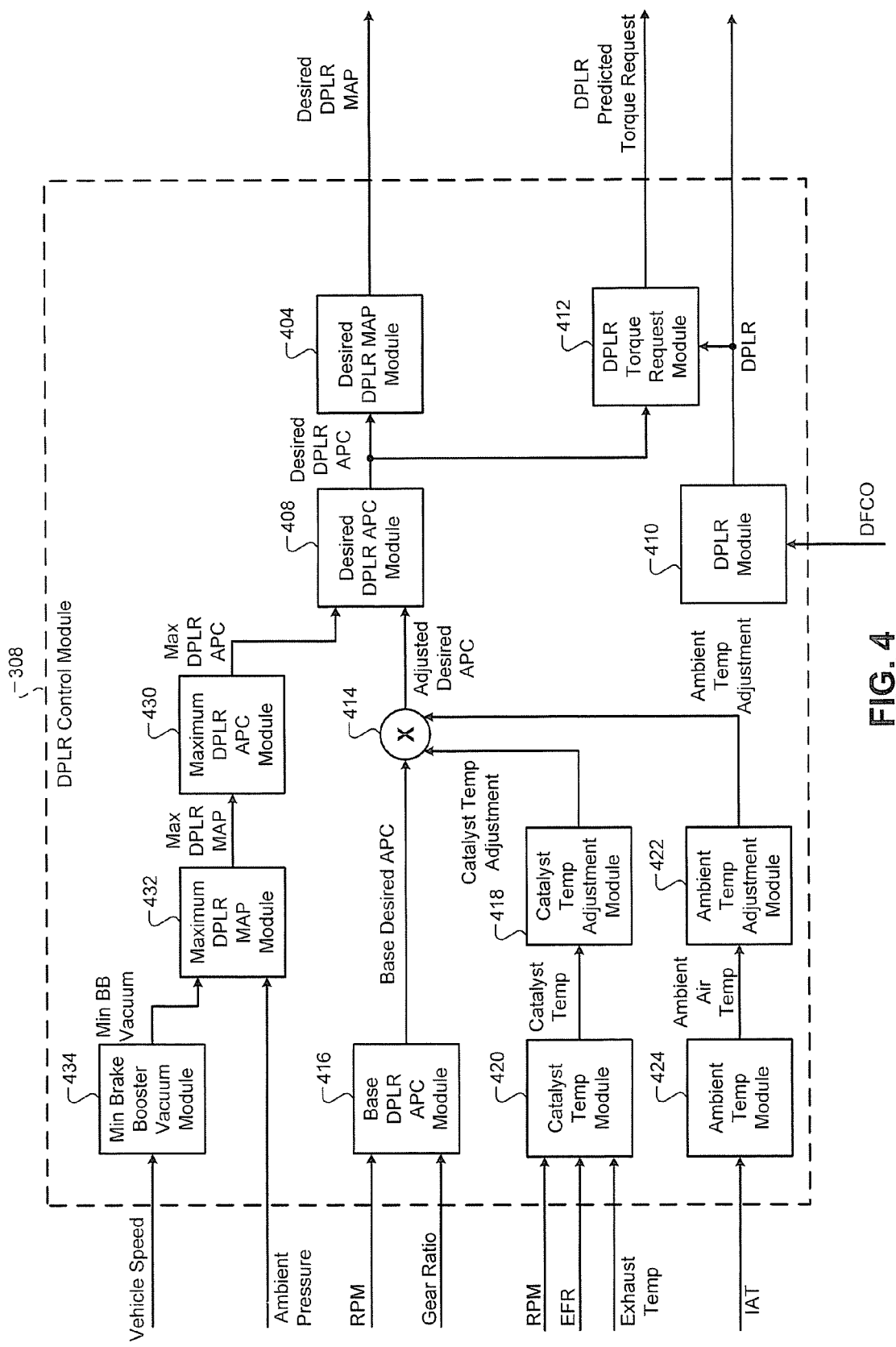
FIG. 4 is a functional block diagram of an exemplary implementation of a DPLR control module according to the principles of the present disclosure.

Referring now to FIG. 4, a functional block diagram of an exemplary implementation of the DPLR control module 308 is presented. The DPLR control module 308 may include a desired DPLR MAP module 404, a desired DPLR APC module 408, a DPLR module 410, and a DPLR torque request module 412. The DPLR control module 308 may also include an APC adjustment module 414, a base DPLR APC module 416, a catalyst temp adjustment module 418, and a catalyst temp module 420. The DPLR control module 308 may also include an ambient temp adjustment module 422, an ambient temp module 424, a maximum DPLR APC module 430, a maximum DPLR MAP module 432, and a min brake booster vacuum module 434.

The desired DPLR MAP module 404 may determine the desired DPLR MAP and provide the desired DPLR MAP to the engine capacities module 274. The desired DPLR MAP module 404 may determine the desired DPLR MAP based on the desired DPLR APC. More specifically, the desired MAP module 404 may determine the desired DPLR MAP by converting the desired DPLR APC into the desired DPLR MAP. For example only, the desired DPLR MAP module 404 may convert the desired DPLR APC into the desired DPLR MAP using one or more tables, equations, and/or other suitable APC to MAP conversion methods.

The desired DPLR MAP may correspond to a desired MAP to be achieved during DFCO to achieve pumping loss reduction. In other implementations, the desired DPLR MAP may instead be in terms of engine vacuum. The desired DPLR MAP may be determined to achieve one or more desired responses. For example only, the desired DPLR MAP module 404 may determine the desired DPLR MAP to maximize the reduction of pumping losses during DFCO compared to the maximum pumping losses sustained when the MAP is equal to the minimum MAP. The desired responses for when DPLR and DFCO are disabled may include, for example, maintaining proper combustion when the provision of fuel is resumed, minimizing the delay between when DFCO is disabled and when the provision of fuel can be resumed under the airflow conditions, and minimizing vibration experienced by one or more users of the vehicle when combustion resumes.

The desired DPLR APC module 408 may provide the desired DPLR APC to the desired DPLR MAP module 404. The desired DPLR APC module 408 may determine the desired DPLR APC based on a maximum DPLR APC and an adjusted desired APC. For example only, the desired DPLR APC module 408 may determine a lesser one of the maximum DPLR APC and the adjusted desired APC and set the desired DPLR APC as the lesser one. In other words, the desired DPLR APC module 408 may set the desired DPLR APC equal to the maximum DPLR APC when the maximum DPLR APC is less than the adjusted desired APC and may set the desired DPLR APC equal to the adjusted desired APC when the adjusted desired APC is less than the maximum DPLR APC. The maximum DPLR APC is discussed further below.

The DPLR module 410 may determine whether DPLR should be performed during DFCO. The DFCO signal may indicate whether DFCO is being performed. The DPLR module 410 may enable the performance of DPLR by setting the state of the DPLR signal. For example only, the DPLR module 410 may enable the DPLR torque request module 412 by setting the state of the DPLR signal to the active state. Written conversely, the DPLR module 410 may disable the DPLR torque request module 412 by setting the state of the DPLR signal to the inactive state.

When enabled, the DPLR torque request module 412 may determine the DPLR predicted torque request based on the desired DPLR APC. The DPLR torque request module 412 may determine the DPLR predicted torque request further based on other suitable parameters. For example only, the DPLR torque request module 412 may determine the DPLR predicted torque request using the desired DPLR APC and the torque relationship (1) described above in conjunction with the torque estimation module 244 or another similar relationship between APC and torque.

The APC adjustment module 414 provides the adjusted desired APC to the desired DPLR APC module 408. The adjusted desired APC may correspond to a desired APC to perform DPLR that has been adjusted to account for current operating conditions. The operating conditions may include, for example, ambient air temperature, catalyst temperature, and other suitable operating conditions.

The APC adjustment module 414 may determine the adjusted desired APC based on a base desired APC, a catalyst temperature adjustment (i.e., catalyst temp adjustment), and an ambient temperature adjustment (i.e., ambient temp adjustment). More specifically, the APC adjustment module 414 may determine the adjusted desired APC by adjusting the base desired APC based on the catalyst temperature adjustment and the ambient temperature adjustment. For example only, the APC adjustment module 414 may determine the adjusted desired APC as a product of the base desired APC, the catalyst temperature adjustment, and the ambient temperature adjustment.

The base DPLR APC module 416 determines the base desired APC and provides the base desired APC to the APC adjustment module 414. The base desired APC may correspond to the desired APC to perform DPLR that has not been adjusted. The base DPLR APC module 416 may determine the base desired APC based on the RPM and the gear ratio engaged within the transmission. The determination of the base desired APC may be to minimize vibration experienced at the RPM and gear ratio.

The base desired APC may correspond to an APC to minimize pumping losses while the catalyst temperature is within a predetermined temperature range and the ambient air temperature is greater than a predetermined temperature during DFCO. For example only, the predetermined temperature range may include catalyst temperatures between approximately 650° C. and approximately 850° C. The predetermined temperature may be approximately 10° C.

The catalyst temp adjustment module 418 may determine the catalyst temperature adjustment based on the catalyst temperature. The catalyst temp adjustment module 418 may determine the catalyst temperature adjustment, for example, from a lookup table of catalyst temperature adjustments indexed by catalyst temperature.

For example only, the catalyst temperature adjustment may include a value between approximately 0.0 and approximately 1.0, inclusive, and the catalyst temperature adjustment may be approximately 1.0 when the catalyst temperature is within the predetermined temperature range. The catalyst temperature adjustment may decrease toward 0.0 as the catalyst temperature increases above the predetermined temperature range (e.g., toward approximately 950° C.). The catalyst 136 may sustain damage (e.g., thermal shock) when the catalyst 136 is exposed to oxygen while the catalyst temperature is greater than the predetermined temperature range. The catalyst 136 may also sustain damage when the catalyst 136 is cooled at too rapid of a rate. Cooling the catalyst 136 at too rapid of a rate may be encountered more frequently when the catalyst temperature is greater than the predetermined temperature range.

The catalyst temperature adjustment may also decrease toward 0.0 as the catalyst temperature decreases below the predetermined temperature range (e.g., toward approximately 400° C.). The catalyst 136 may be less effective at reacting with components of the exhaust at temperatures less than the predetermined temperature range.

The catalyst temp module 420 may determine the catalyst temperature. For example only, the catalyst temp module 420 may determine the catalyst temperature based on the RPM, an exhaust flow rate (EFR), and an exhaust temperature. The exhaust temperature may include a temperature measured, for example, within the exhaust system 134 at a location upstream of the catalyst 136. The EFR may include an EFR measured using an EFR sensor (not shown) or estimated based on, for example, the MAF.

The ambient temp adjustment module 422 may determine the ambient temperature adjustment based on an ambient air temperature. The ambient temp adjustment module 422 may determine the ambient temperature adjustment, for example, from a lookup table of ambient temperature adjustments indexed by ambient air temperature.

For example only, the ambient temperature adjustment may include a value between approximately 0.0 and approximately 1.0, inclusive, and the ambient temperature adjustment may be approximately 1.0 when the ambient air temperature is greater than the predetermined temperature. The ambient temperature adjustment may decrease toward a predetermined value (e.g., 0.8) as the ambient temperature approaches a second predetermined temperature (e.g., approximately −10° C.) and may decrease from the predetermined value toward 0.0 as the ambient air temperature decreases below the second predetermined temperature.

Ambient air temperatures less than the predetermined temperature may cause stiffening of motor mounts (not shown) and other vehicle components that damp the transmission of vibrations from the engine 102 to the rest of the vehicle. The stiffening may decrease the damping ability of the motor mounts and other vehicle components, and the stiffening may increase observable vibration.

The ambient temp module 424 may determine the ambient air temperature. In some implementations, the ambient air temperature may be measured by an ambient air temperature sensor. In other implementations, the ambient air temperature may be determined based on one or more measured temperatures. The ambient temp module 424 may determine the ambient air temperature based on, for example, the IAT. For example only, the ambient temp module 424 may determine the ambient air temperature as a lowest IAT measured during a drive cycle. One drive cycle may be defined by a period between when a driver commands vehicle startup (e.g., via an ignition key, button, etc) and when the driver commands vehicle shutdown.

The maximum DPLR APC module 430 may determine the maximum DPLR APC, originally introduced above. The maximum DPLR APC may correspond to a maximum APC achievable during the performance of DPLR. The maximum DPLR APC module 430 may determine the maximum DPLR APC based on, for example, a maximum DPLR MAP. The maximum DPLR APC module 430 may determine the maximum DPLR APC, for example, by converting the maximum DPLR MAP into the maximum DPLR APC. For example only, the MAP to APC conversion may be similar (e.g., the inverse) to the conversion method used in converting the desired DPLR APC into the desired DPLR MAP and/or another similar manner of conversion.

The maximum DPLR MAP module 432 may determine the maximum DPLR MAP. The maximum DPLR MAP may correspond to a maximum MAP during the performance of DPLR corresponding to the maximum DPLR APC achievable under the current ambient air pressure conditions while maintaining a minimum vacuum within the intake manifold 110 for the brake booster 106 to assist in vehicle braking. The maximum DPLR MAP module 432 may determine the maximum DPLR MAP, for example, based on a difference between the ambient air pressure and the minimum vacuum. For example only, the maximum DPLR MAP module 432 may determine the maximum DPLR MAP based on the ambient air pressure less the minimum vacuum.

The min brake booster vacuum module 434 may determine the minimum vacuum for the brake booster 106. The minimum vacuum may correspond to vacuum within the intake manifold 110 necessary to enable the brake booster 106 to provide vehicle braking assistance under the current operating conditions. In some implementations, the minimum vacuum may be expressed in terms of MAP. The minimum vacuum may be a predetermined vacuum (e.g., approximately 20 kPa of vacuum) or determined based on one or more parameters. For example only, the minimum vacuum may be determined based on the vehicle speed.

Figure 5:
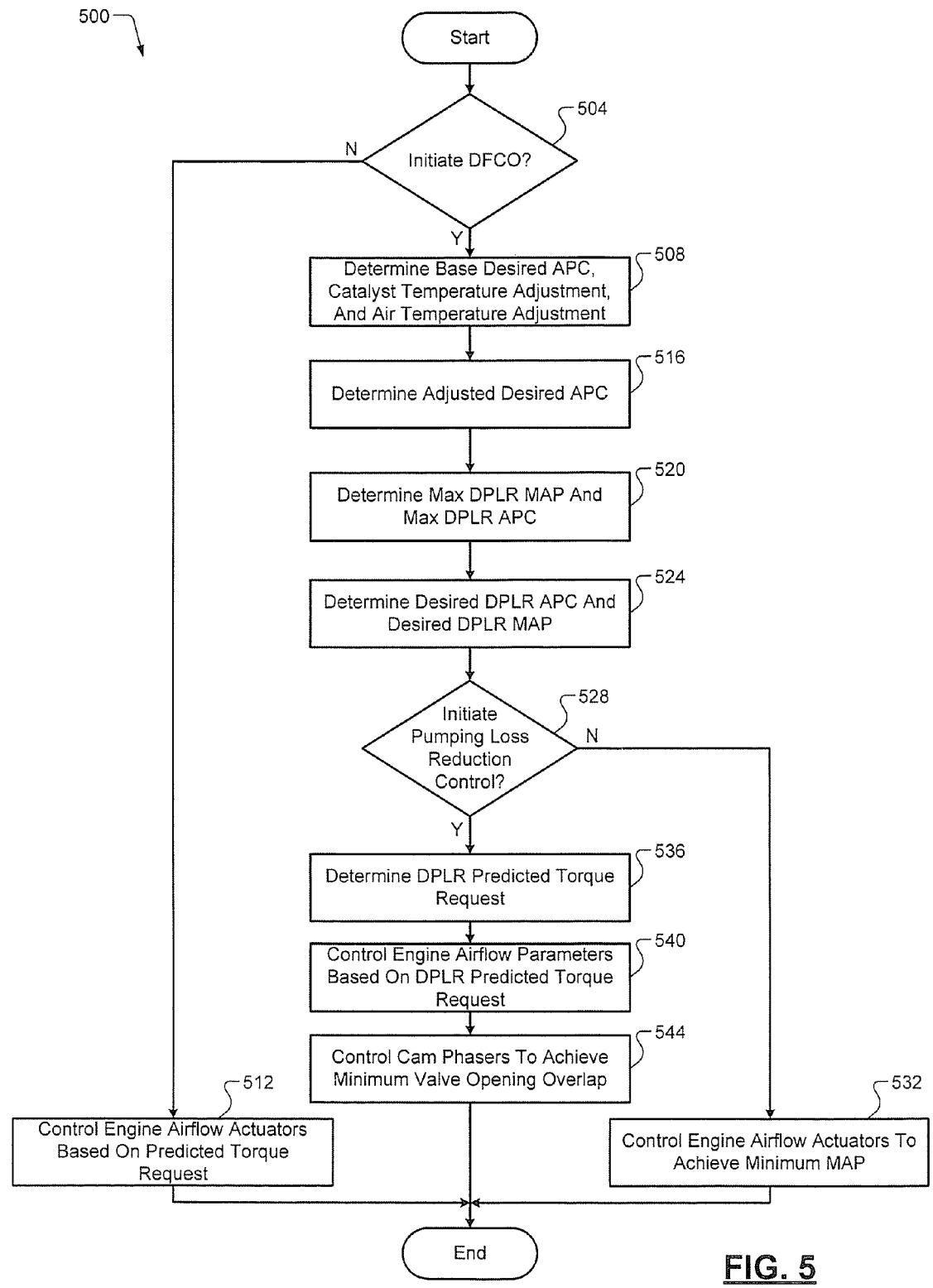
FIGS. 5-6 are flowcharts depicting exemplary steps performed by methods according to the principles of the present disclosure.

Referring now to FIG. 5, a flowchart depicting exemplary steps 500 performed by a method is presented. Control may begin in step 504 where control determines whether to initiate DFCO. If true, control may proceed to step 508; if false, control may control the engine airflow actuators based on the predicted torque request (e.g., based on the driver torque request) in step 512 and control may end.

In step 508, control may determine the base desired APC, the catalyst temperature adjustment, and the air temperature adjustment. Control may determine the base desired APC based on the RPM and the gear ratio. Control may determine the catalyst temperature adjustment and the air temperature adjustment based on the catalyst temperature and the ambient air temperature, respectively.

Control may determine the adjusted desired APC in step 516. For example only, control may determine the adjusted desired APC based on the product of the base desired APC, the catalyst temperature adjustment, and the air temperature adjustment. In step 520, control may determine the maximum DPLR MAP and the maximum DPLR APC. Control may determine the maximum DPLR MAP based on the ambient pressure and the minimum brake booster vacuum. Control may determine the maximum DPLR APC based on the maximum DPLR MAP.

Control may determine the desired DPLR APC and the desired DPLR MAP in step 524. For example only, control may select the lesser one of the maximum DPLR APC and the adjusted desired APC as the desired DPLR APC. Control may determine the desired DPLR MAP based on the desired DFCO APC. Control may also determine the minimum and maximum off torque capacities in step 524.

In step 528, control may determine whether to initiate DPLR. In other words, control may determine whether to achieve a reduction in pumping losses compared to the maximum pumping losses sustained during DFCO while the MAP is equal to the minimum MAP. If true, control may proceed to step 536. If false, control may control the engine airflow actuators to achieve the minimum MAP in step 532, and control may end.

Control may determine the DPLR predicted torque request in step 536. Control may determine the DPLR predicted torque request based on the desired DPLR APC. The desired DPLR MAP may be used to determine the maximum off torque capacity. Control may control the engine airflow actuators based on the DPLR predicted torque request in step 540. Control may control the intake and exhaust cam phaser angles in step 544 to achieve minimum valve opening overlap in step 544. Controlling the engine airflow actuators based on the DPLR predicted torque request and adjusting the intake and exhaust cam phaser angles to achieve minimum valve opening overlap causes a reduction in the pumping losses that would otherwise be sustained during DFCO Control may then end.

Figure 6:
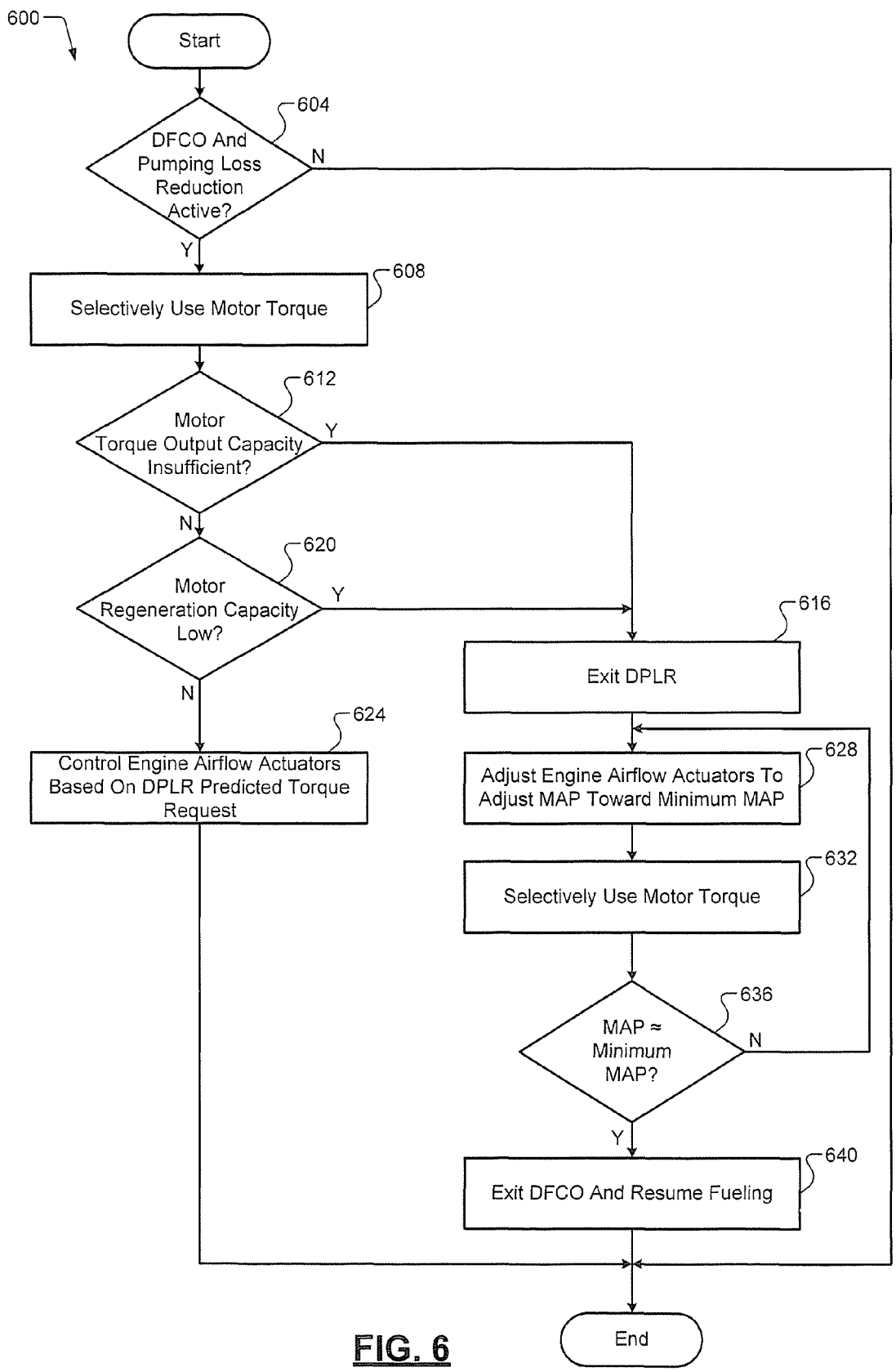

Referring now to FIG. 6, another flowchart depicting exemplary steps 600 performed by a method is presented. Control may begin in step 604 where control determines whether DFCO is active. If true, control may proceed to step 608; if false, control may end. Control may control selectively utilize the electric motor 198 to supply torque output and achieve the torque requests (e.g., the predicted and immediate propulsion torque requests) in step 608.

In step 612, control may determine whether the torque output capacity of the electric motor 198 is insufficient. If true, control may proceed to step 616 and exit (e.g., disable) DPLR in step 616. If false, control may continue to step 620. Control may determine whether the regeneration capacity of the electric motor 198 is low in step 620. If false, control may continue to control the engine airflow actuators based on the DPLR predicted torque request in step 624 and control may end. If true, control may transfer to step 616 and exit DPLR.

Control may proceed from step 616 to step 628 where control adjusts the engine airflow actuators to adjust the MAP toward the minimum MAP. Control may selectively utilize the electric motor 198 to produce torque output in step 632. For example only, torque output from the electric motor 198 may be used to offset the difference between the engine torque output and the driver torque request. Torque output from the electric motor 198 may also be used to meet the torque requests.

In step 636, control may determine whether the MAP is approximately equal to the minimum MAP. If true, control may exit DFCO and resume providing fuel to the engine 102 in step 640. If false, control may return to step 628. In some implementations, control may determine whether the MAP is sufficiently close to the minimum MAP in step 636. Whether the MAP is sufficiently close to the minimum MAP may be determined based on, for example, the magnitude of the driver torque request. For example only, a greater difference between the MAP and the minimum MAP may be deemed sufficiently close as the driver torque request increases. Control may end after step 640.

Figure 7:
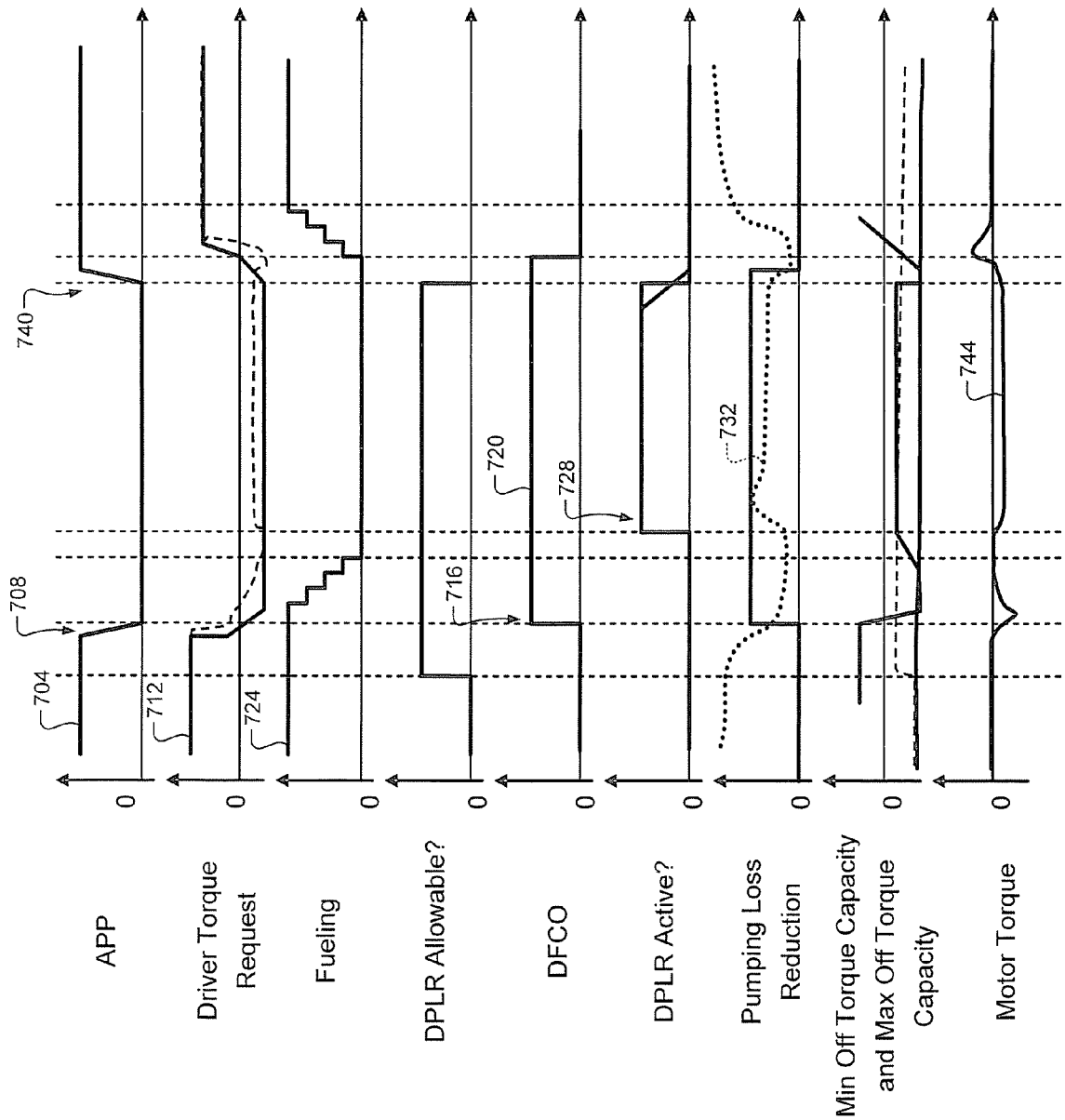
FIG. 7 is an exemplary graph of various operating parameters versus time according to the principles of the present disclosure.

Referring now to FIG. 7, a graph of various operating parameters is presented. For example only, a driver may remove pressure from the accelerator pedal under some circumstances, as indicated by the decrease in exemplary APP trace 704 at approximately time 708. The driver torque request may correspondingly decrease as illustrated by the decrease in exemplary driver torque request trace 712.

The decreased the driver torque request trace 712 and other enabling conditions may provide for the initiation of DFCO at approximately time 716 as illustrated by the transition of exemplary DFCO state trace 720. When DFCO is initiated at approximately time 716, the provision of fuel to the engine 102 is disabled as illustrated by exemplary fueling trace 724. The step decreases in the fueling trace 724 may be attributable to, for example, disablement of the cylinders of the engine 102 cylinder-by-cylinder.

Once the provision of fuel to the engine 102 has been disabled, as shown at approximately time 728, the engine airflow actuators may be adjusted for the performance of DPLR as illustrated by exemplary airflow trace 732. This increase in the airflow trace 732 may be attributable to the decreasing of pumping losses.

At approximately time 740, the driver begins to actuate the accelerator pedal again, as reflected in the increasing APP trace 704. A corresponding increase in the driver torque request trace 712 also occurs. Accordingly, the performance of DPLR may be disabled and the provision of fuel to the engine 102 may be resumed. This disabling and resumed provision of fuel to the engine 102 may be illustrated in the DFCO state trace 720 and the fueling trace 724, respectively, shown after approximately time 740.

To minimize vibration experienced when the provision of fueling is resumed, the airflow parameters (e.g., the MAP) may be decreased as illustrated by the airflow trace 732 at approximately time 740. More specifically, the MAP may be decreased toward the minimum MAP. However, this decrease may cause an increase in pumping losses and therefore an increase in the braking torque applied to the engine 102. The electric motor 198 may be controlled to output torque, provide a smooth drive away, and offset the increased pumping losses, as illustrated by the increase in exemplary motor torque output trace 744 at approximately time 740.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system for a vehicle, comprising:
    a base air per cylinder (APC) module that determines a base APC to reduce first engine pumping losses during a first deceleration fuel cutoff (DFCO) event relative to second engine pumping losses during a second DFCO event,
    wherein engine airflow actuators are controlled throughout the second DFCO event to achieve a minimum manifold absolute pressure (MAP) for combustion when the second DFCO event ends and fuel is provided to the engine;
    a catalyst temperature adjustment module that determines a catalyst temperature adjustment based on a catalyst temperature during the first DFCO event;
    an ambient temperature adjustment module that determines an ambient temperature adjustment based on an ambient air temperature during the first DFCO event; and
    an APC adjustment module that selectively adjusts the base APC based on the catalyst temperature adjustment and the ambient temperature adjustment and that controls at least one of the engine airflow actuators based on the adjusted base APC during the first DFCO event.

2. The engine control system of claim 1 wherein the APC adjustment module determines the adjusted base APC based on a product of the base APC, the catalyst temperature adjustment, and the ambient temperature adjustment.

3. The engine control system of claim 2 wherein the catalyst temperature adjustment module sets the catalyst temperature adjustment to a predetermined value when the catalyst temperature is within a predetermined temperature range and sets the catalyst temperature adjustment to one of greater than and less than the predetermined value when the catalyst temperature is one of greater than and less than the predetermined temperature range.

4. The engine control system of claim 2 wherein the ambient temperature adjustment module sets the ambient temperature adjustment to a predetermined value when ambient air temperature is greater than a predetermined temperature and sets the ambient temperature adjustment to one of greater than and less than the predetermined value when the ambient air temperature is less than the predetermined temperature.

5. The engine control system of claim 1 wherein the base APC module determines the base APC based on a gear ratio of a transmission and an engine speed.

6. The engine control system of claim 1 further comprising:
    a maximum MAP module that determines a maximum MAP during the first DFCO event based on ambient air pressure and a minimum engine vacuum for a brake booster;
    a maximum APC module that determines a maximum APC during the first DFCO event based on the maximum MAP;
    a desired APC module that determines a desired APC to achieve the reduction based on one of the maximum APC and the adjusted base APC; and
    a torque request module that controls the at least one engine airflow actuator based on the desired APC.

7. The engine control system of claim 6 wherein the torque request module adjusts the MAP toward the minimum MAP before the fuel is provided to the engine.

8. The engine control system of claim 7 wherein the torque request module adjusts the MAP toward the minimum MAP when at least one of a torque output capacity of an electric motor is less than a predetermined torque and regeneration capacity is less than a predetermined capacity.

9. The engine control system of claim 7 further comprising a hybrid control module that controls torque output by an electric motor to achieve a driver torque request while the torque request module adjusts the MAP toward the minimum MAP.

10. The engine control system of claim 9 further comprising a DFCO module that selectively initiates the provision of fuel to the engine when a difference between the MAP and the minimum MAP is less than a predetermined difference,
    wherein the DFCO module determines the difference based on a magnitude of the driver torque request.

11. An engine control method for a vehicle, comprising:
    determining a base air per cylinder (APC) to reduce first engine pumping losses during a first deceleration fuel cutoff (DFCO) event relative to second engine pumping losses during a second DFCO event,
    wherein engine airflow actuators are controlled throughout the second DFCO event to achieve a minimum manifold absolute pressure (MAP) for combustion when the second DFCO event ends and fuel is provided to the engine;
    determining a catalyst temperature adjustment based on a catalyst temperature during the first DFCO event;
    determining an ambient temperature adjustment based on an ambient air temperature during the first DFCO event;
    selectively adjusting the base APC based on the catalyst temperature adjustment and the ambient temperature adjustment; and
    controlling at least one of the engine airflow actuators based on the adjusted base APC during the first DFCO event.

12. The engine control method of claim 11 further comprising determining the adjusted base APC based on a product of the base APC, the catalyst temperature adjustment, and the ambient temperature adjustment.

13. The engine control method of claim 12 further comprising:

setting the catalyst temperature adjustment to a predetermined value when the catalyst temperature is within a predetermined temperature range; and setting the catalyst temperature adjustment to one of greater than and less than the predetermined value when the catalyst temperature is one of greater than and less than the predetermined temperature range.

14. The engine control method of claim 12 further comprising:

setting the ambient temperature adjustment to a predetermined value when ambient air temperature is greater than a predetermined temperature; and setting the ambient temperature adjustment to one of greater than and less than the predetermined value when the ambient air temperature is less than the predetermined temperature.

15. The engine control method of claim 11 further comprising determining the base APC based on a gear ratio of a transmission and an engine speed.

16. The engine control method of claim 11 further comprising:

determining a maximum manifold absolute pressure (MAP) during the first DFCO event based on ambient air pressure and a minimum engine vacuum for a brake booster;

determining a maximum APC during the first DFCO event based on the maximum MAP;

determining a desired APC to achieve the reduction based on one of the maximum APC and the adjusted base APC; and controlling the at least one engine airflow actuator based on the desired APC.

17. The engine control method of claim 16 further comprising adjusting the MAP toward the minimum MAP before the fuel is provided to the engine.

18. The engine control method of claim 17 further comprising adjusting the MAP toward the minimum MAP when at least one of a torque output capacity of an electric motor is less than a predetermined torque and a regeneration capacity is less than a predetermined capacity.

19. The engine control method of claim 17 further comprising controlling torque output by an electric motor to achieve a driver torque request during the adjusting the MAP toward the minimum MAP.

20. The engine control method of claim 19 further comprising:

selectively initiating the provision of fuel to the engine when a difference between the MAP and the minimum MAP is less than a predetermined difference; and determining the difference based on a magnitude of the driver torque request.

\* \* \* \* \*